United States Patent [19]

Fugleberg et al.

[11] 3,979,266

[45] Sept. 7, 1976

[54] PROCESS FOR PURIFYING AQUEOUS SOLUTIONS, OF METAL IONS PRECIPITATING AS ARSENIDES, ANTIMONIDES, TELLURIDES, AND SELENIDES

[75] Inventors: Sigmund Peder Fugleberg, Kokkola; Jussi Kalevi Rastas, Pori, both of Finland

[73] Assignee: Outokumpu Oy, Helsinki, Finland

[22] Filed: Sept. 8, 1975

[21] Appl. No.: 611,002

[30] Foreign Application Priority Data

Sept. 20, 1974 Finland.............................. 2754/74

[52] U.S. Cl................................. 204/119; 204/130; 423/42; 423/140
[51] Int. Cl.$^2$......................................... C25C 1/16
[58] Field of Search .............. 75/109; 204/119, 130; 423/140, 42

[56] References Cited

UNITED STATES PATENTS 3,672,868   6/1972   Hasegawa et al..................... 75/109

Primary Examiner—R. L. Andrews
Attorney, Agent, or Firm—Brooks Haidt Haffner & Delahunty

[57] ABSTRACT

A process for purifying aqueous solutions, of metal ions precipitating as arsenides, antimonides, tellurides, selenides, and tin and mercury alloys, wherein arsenic, antimony, tellurium, selenium, tin, mercury and/or compounds of the same are added to the aqueous solution as auxiliary agents, whereafter the impurities are cemented under reducing conditions by means of the auxiliary agent, and the cementation is catalyzed by means of the formed cementate by contacting the aqueous solution with the cementate, the quantity of which is substantially greater than that primarily cemented from the aqueous solution.

11 Claims, No Drawings

PROCESS FOR PURIFYING AQUEOUS SOLUTIONS, OF METAL IONS PRECIPITATING AS ARSENIDES, ANTIMONIDES, TELLURIDES, AND SELENIDES

BACKGROUND OF THE INVENTION

The present invention relates to a process for purifying aqueous solutions, of metal ions precipitating as arsenides, antimonides, tellurides, selenides, and tin and mercury alloys, wherein arsenic, antimony, tellurium, selenium, tin, mercury, and/or compounds of the same are added to the aqueous solution as auxiliary agents, whereafter the impurities are precipitated under reducing conditions with the help of the auxiliary agent.

The main raw materials used in the electrolytic zinc process are zinc concentrates which first undergo an oxidizing roasting. The calcine is leached in the return acid bearing sulfuric acid, returning from the electrolytic precipitation. The insoluble materials are removed from the zinc sulfate solution thereby produced, which has a pH of 4–5 and a zinc concentration of 100–180 g/l. The clear solution, the raw solution, is directed further to the solution purification, wherein all elements nobler than zinc are removed. After the purification the purified solution is fed to the electrolysis. At this electrolytic refining stage the zinc deposits in metallic form on the aluminum cathodes. The sulfuric acid produced in the electrolysis is returned to the solution of fresh calcine.

The process according to the invention can be advantageously linked to the solution purification stage of the electrolytic zinc process; this stage is described below in more detail.

The raw solution of the zinc process contains a number of elements nobler than zinc, their concentrations in the solution varying considerably according to the zinc concentrates and the raw materials used for the production of zinc. The most important of these elements are copper, cadmium, cobalt, nickel, arsenic, antimony, germanium, tellurium, and thallium. Since the said elements are nobler than zinc, they tend to deposit on the cathode in the electrolysis. This is not desirable, for two reasons: (1) they make the precipitating zinc impure, (2) some of these elements are "electrolytic poisons" which cause side reactions, mainly zinc corrosion (generation of $H_2$: $2H^+ + Zn \rightarrow H_2 + Zn^{2+}$) partly through microelement formation and partly through reaction mechanisms not known in more detail. Of the above elements, cobalt, nickel, arsenic, antimony and germanium must be removed from the solution because they are "electrolytic poisons", and copper, cadmium and thallium in order that they should not make impure the zinc to be precipitated. In addition, copper and cadmium are always present in such large quantities that their recovery is also economically profitable.

Since the above elements are nobler than zinc, it is in principle possible to cement them from the solution by means of metallic zinc according to the following reaction equation: $Me^{2+}(aq) + Zn(s) \rightarrow Me(s) + Zn^{2+}(aq)$. This is almost the only method used in the production of zinc. Finely-divided zinc powder is added to the solution. When the concentrations of the elements in question — in this case, elements to be counted as impurities — are sufficiently low, the produced metal powder is separated and the purified solution is fed to the electrolysis.

In practice, however, the situation is somewhat more complicated than above. Experience has shown that when only zinc powder is used for the cementation, cobalt cannot be cemented to such a low concentration as is necessary for obtaining advantageous conditions for the electrolysis; also, the removal of nickel from the solution by normal cementation is difficult.

It has been observed, however, that the cementation of cobalt and nickel can be facilitated by adding certain elements to the solution in the form of suitable compounds. Arsenic (BP 126 296) and antimony, which are usually added to the solution in the form of trioxides, have proven very effective additives. To our knowledge, they are the only additives used for this purpose on an industrial scale. It has, however, been proven by laboratory experiments that some other elements, such as mercury, tin and tellurium, are also suitable additives (Electrochim. Acta 14 (1969) 829–844; Dvetnye Metally (1961) No. 2, 39–43).

One method used for removing cobalt from a solution is cementing it as a poorly soluble salt by means of $\alpha$-nitroso-$\beta$-naphthol or xanthates, in which case all the other impurities are removed by normal zinc powder cementation. The said reagents are, however, relatively expensive; in addition, these cementation methods cannot be used if nickel is present in the solution in a considerable quantity.

In the process according to the invention, arsenic, antimony, tellurium, selenium, tin or mercury can be used effectively in connection with the cementation of metal ions, such as cobalt and nickel, in a manner which eliminates most of the drawbacks linked to the methods currently in use.

The batch operation is used in the normal solution purification process currently used. The reactors are filled with raw solution, the solution is heated within 85°–95°C, a varying quantity (50–200 mg/l) of arsenic trioxide is added, and thereafter zinc powder is added until the cobalt is almost completely cemented. This requires zinc powder in a quantity of approx. 2–4 g/l, depending on the cobalt concentration in the solution. As proven by experience, when all of the cobalt has been cemented, practically all of the copper, nickel, arsenic, and antimony has been removed from the solution, while most of the cadmium and thallium remains in the solution. The cementate is separated from the solution and the solution is fed to the following solution purification stage, during which the cadmium and thallium are cemented by using only zinc powder. Thereafter the solution purification is complete.

For the cobalt cementation described above to be successful it is necessary that the solution contains a suitable quantity of $Cu^{2+}$ ions. In practice it is often considered that to obtain the best results the $Cu^{2+}$ concentration must be approx. 400 g/l. A corresponding copper quantity is usually present in normal concentrates. If the copper quantity is too small, copper sulfate must be added. If the copper quantity is great, part of the copper is first removed by using less than a sufficient quantity of zinc powder for the cementation. In some cases the cementation of cobalt is performed as a continuous process but otherwise under conditions corresponding to the batch process.

The concentrations of the various elements in the raw solution normally vary within the following limits: Cu 300–500 mg/l, Co 1–60 mg/l, Ni 1–40 mg/l, Cd 200–500 mg/l, Tl 0–10 mg/l, Sb < 1 mg/l. The quantity of $As_2O_3$ to be added to the solution is usually 50–200 mg/l. The analysis of the respective cementate is in that case as follows: Cu 30–50 %, Co 0.1–3 %, Ni 0.1–2 %, As 3–15 %, Cd 1–3 %, and Zn ~ 10%. This cementate, which is called "Cu-residue", was previously usually fed into copper smelting plants. Recently, owing to the increasing demands of environmental protection and the problems caused by arsenic in copper processes, the use of the Cu-residue has been continuously complicated. Besides, of the elements present in this residue, it has been possible to recover only the copper, while the zinc, cadmium, cobalt, nickel and arsenic have been wasted.

Great efforts have been put into eliminating these drawbacks. Attempts have been made, on the one hand, to treat the Cu-residue to remove the arsenic (Erzmetall 26 (1973) 60–65) and on the other hand, to find new methods for removing the cobalt. In the former case, it can be noted that the treatment of Cu-residue is usually expensive and requires several stages if the object is to recover zinc and cadmium in addition to arsenic. In the latter case the object has led to a process in which cobalt — after the cementation of copper and cadmium — is by means of a great excess of zinc powder in the presence of lead and small quantities of $Sb_2O_3$ (Belgian Pat. No. 783 549), whereby it is possible to eliminate the problems and disadvantages due to large arsenic quantities. In this case, however, considerable expenses are incurred owing to the high consumption of zinc powder.

SUMMARY OF THE INVENTION

The present invention is based on the conception that catalyzing surfaces can be used for strongly affecting the velocity of the heterogeneous reaction which the cementation of cobalt and nickel by means of zinc powder in the presence of arsenic trioxide. As mentioned above, experience has proven that copper ions and arsenic compounds must be present in the solution in order that the cementation of cobalt should be successful when the cementation is performed in the manner described above. It is known that copper and arsenic are precipitated from the solution first. Our investigations have shown that the compound which precipitates at this time (at the final stage of the cementation) is $\beta$-$Cu_3As$. It can be thought that the $Cu_3As$ which cements first forms a catalyzing surface on which both coblt and nickel are deposited as arsenides. On the basis of this idea it can be understood that a relatively large copper quantity is necessary when the object is to cement cobalt and nickel completely from the solution — within the period normally used for this solution purification stage. The microanalyzer measurements performed in order to determine the composition of the cementate indicate that the cobalt and nickel are deposited as a compound of the type MeAs. The results of the experiments further indicate that the cobalt and nickel arsenides in the cementate act as catalysts in a respective manner as $Cu_3As$. It can thus also be understood that the presence of copper is not necessary for a successful cementation.

DESCRIPTION OF THE PREFERRED EMBODIMENTS

The experiments on the basis of which the above conclusions were made were performed as follows: Arsenic trioxide and copper sulfate were added to a $ZnSO_4$ solution bearing both $Co^{2+}$ and $Ni^{2+}$ ions. Zinc powder was added to the solution until practically all of the cobalt was cemented. The cementate was allowed to settle on the bottom of the tank, and the clear, purified solution was decanted. A new, impure solution was added into the tank, where the cementate from the previous experiment also remained. The cementation was again performed as above, followed by decantation, filling, cementation, etc. The zinc powder quantity requisite for the complete cementation of cobalt and nickel decreased along with the increase in the quantity of cementate. After a few runs of cementation the additions of $Cu^{2+}$ could also be eliminated without any observable change in the purification efficiency. By performing the cementation in the manner described above it was possible to remove the cobalt and nickel from the solution completely without the presence of $Cu^{2+}$ ions in the solution.

This factor can be taken advantage of in the zinc process by first removing the copper from the solution. This can be performed by cementing it by a known method by means of an equivalent quantity of zinc powder. From this stage the solution proceeds, after the separation of the cementate, to the removal of cobalt and nickel. At this stage the concentration of cobalt and nickel arsenide cementate must be maintained sufficiently high. The cementation can be performed by, for example, the above method or by continuous cementation. Therein the solution is fed, after the cementation, into a thickener and most of the arsenide cementate is returned to the cementation reactor along with the thickened portion from the thickener. A sufficient arsenic quantity in proportion to the metal quantity to be cemented is added to the cobalt and nickel removal stage, usually in the form of arsenic trioxide or an arsenic (III) compound. The actual cementation is performed by means of zinc powder additions. After this stage the solution still contains cadmium and thallium, which are removed at the cadmium removal stage by means of zinc powder cementation.

By this procedure a considerably pure copper cementate is obtained which is a suitable raw material for copper production. The cobalt and nickel are in the arsenide cementate, the cobalt and nickel concentrations of which are high and which has proven to be practically devoid of zinc and cadmium. This cementate can be used as a raw material for the production of cobalt and nickel metals or salts. The treatment can in that case be performed so that the arsenic is recovered. An example of such a treatment is the oxidizing leaching of the arsenide cementate by a water solution of sodium hydroxide in an autoclave (130°–180°C.) Thereby the copper, cobalt and nickel pass into the hydroxidic and oxidic cementate and the arsenic into the solution as an arsenate. The solid and the liquid are separated; the former is fed to the process for recovering copper, cobalt and nickel. Sodium arsenate is crystallized from the solution, and the solution containing free sodium hydroxide is returned, after a base addition, to the arsenide cementate leaching stage; the crystallized sodium arsenate is dissolved in water. This solution is made mildly acid, the arsenic with a valence of five is reduced into trivalent form by means of, for example, sulfur dioxide, and the solution is fed to the cobalt and nickel separation stage of the zinc process. By this procedure, all the metals lost in the conventional treatment of copper residue, that is, zinc, cadmium, cobalt, nickel, and arsenic, are recovered. In addition, considerable savings of zinc powder are effected at the solution purification stages.

According to the invention, the cementation onto the thus produced cementate is catalyzed by contacting the aqueous solution with a cementate quantity which is greater than that primarily precipitated from the aqueous solution. This quantity of cementate is at minimum 5 g/l, advantageously 10–150 g/l and preferably 30–50 g/l in proportion to the solution.

In a continuous-working multi-stage reactor, part of the cementate is returned to some previous stage, preferably from the last stage to the first one, and in a batch process at least part of the cementate can be left in the tank after the aqueous solution has been decanted.

The process according to the invention is very suitable for purifying zinc and cadmium sulfate solutions of, for example, cobalt and nickel. $MgSO_4$, $NaSO_4$ and $(NH_4)_2SO_4$ solutions can also be purified of cobalt, nickel, copper, zinc and cadmium. For example, nitrate and chloride solutions can be purified quite as well as sulfate solutions.

Iron, manganese, aluminum or chromium can be used as a cementing agent in addition to or instead of zinc.

The process according to the invention can also be performed in an autoclave, in which case the generated hydrogen can be used as a reducing agent in the reduction. Carbon monoxide can also be used as a reducing agent instead of hydrogen. Finally, the reducing conditions can also be obtained by a known method by means of electric current.

The reduction is preferably performed at an elevated temperature, e.g., 70°–100°C, but even higher temperatures can be used if the operation takes place in an autoclave.

The invention is described below by means of examples.

EXAMPLE 1

The refining was performed in batches. Cu 100 mg/l (as copper sulfate) and $As_2O_3$ 100 mg/l were added to a raw solution which had a zinc concentration of approx. 150 g/l and which contained Co 20 mg/l, Ni 10 mg/l and Cd 300 mg/l, and the solution was heated to 90°C. Thereafter zinc powder was added to the solution in small batches until the Co test indicated that the solution was "pure". The formed cementate was allowed to settle on the bottom of the tank and the pure solution was decanted. Fresh raw solution was added into the tank, the additions and cementation were performed as above, the cementate was allowed to settle, the pure solution was decanted, fresh solution was taken into the tank, additions, cementation, settling, etc. In the first (1–3) cementations it was difficult to obtain a pure solution, and zinc powder was required in a quantity of 2.5 g/l, in which case the cobalt concentration in the solution was still approx. 1 mg Co/l. After more cementation runs, the removal gradually became easier in the system. After the 15th cementation run the consumption of zinc powder was 1 g/l and the cobalt concentration in the solution <0.2 mg Co/l. After 20 cementation runs had been performed, the addition of copper was discontinued. When 10 more cementation runs were performed without the addition of copper, the efficiency of cobalt removal did not diminish. At the end of the trial series the consumption of zinc powder had decreased to 0.8 g/l and the cobalt concentration in the solution after each test was <0.2 mg/Co/l.

Finally the produced cementate, the quantity of which was 5.59 g/l, was separated, washed and analyzed. The analysis of the cementate was:

| Cu | Co | Ni | As | Cd | Zn |
|----|----|----|----|----|----|
| 41 | 11 | 6.0 | 38 | 0.15 | 0.36% |

EXAMPLE 2

$ZnSO_4$ solution, which contained Cu 30 mg/l, Co 20 mg/l, Ni 12 mg/l and Cd 300 mg/l, was pumped into a three-part serial reactor. Arsenic trioxide 100 mg/l was added into the first reactor, and zinc powder was added into the first and the second reactor. From the third reactor the solution proceeded into the thickener. Clear solution was removed as an overflow from the thickener and the cementate was returned along with the thickened portion to the first reactor. When the concentration of cementate in the reactors surpassed 10 g/l, a pure solution was obtained with a zinc powder feed of 0.8 g/l. During the operation the temperature varied between 75°C and 100°C.

Using the same operation method, an experiment was made with a solution which contained Cu 80 mg/l, Co 60 mg/l and Ni 30 mg/l. The addition of $As_2O_3$ was 250 mg/l. A pure solution was obtained with a zinc powder feed of 1.8 g/l. The cementate concentration in the system was then 25–30 g/l.

During the operation, the feed solution was changed into one devoid of $Cu^{2+}$ ions; the purification efficiency of the system did not change.

The composition of the cementate varied within:

| Cu | Co | Ni | As | Cd | Zn |
|----|----|----|----|----|----|
| 15–25 | 12–15 | 7–9 | ~45 | 0.1–0.2 | 0.3–0.5% |

EXAMPLE 3

The effect of the cementate concentration was investigated. Varying quantities of cementate were taken from the system described in Example 2 and added to solutions of varying composition. The solutions were purified in batches with as small zinc powder additions as possible until the solutions were pure.

When the cementate concentration was 30 g/l and the solution contained Co 20 mg/l and Ni 10 mg/l, and the $As_2O_3$ addition was 100 mg/l, pure solution was obtained with a zinc powder quantity of 0.2–0.3 g/l.

When the cementate concentration was 150 g/l and the solution contained Co 60 mg/l and Ni 30 mg/l, and the $As_2O_3$ addition was 250 mg/l, pure solution was obtained with a zinc powder quantity of 0.4 g/l.

What is claimed is:

1. A process for purifying aqueous solutions of cobalt, nickel and copper ions precipitating as arsenides, comprising:
    adding to the aqueous solution as an auxiliary agent at least one of arsenic and arsenic (III) compounds;
    maintaining reducing conditions to cement the impurities from the aqueous solution by means of said auxiliary agent; and
    contacting the aqueous solution with a quantity of the cementate substantially greater than that primarily cemented from the aqueous solution in order to catalyze the cementation.

2. The process of claim 1, in which the aqueous solution is contacted with a cementate the quantity of which is at minimum about 5g/l in proportion to the quantity of the aqueous solution.

3. The process of claim 1, wherein the impurity metals are continuously cemented in several stages from a flow of the aqueous solution, at least part of the cementate being recycled from a stage to at least one previous stage.

4. The process of claim 1, in which the aqueous solution is separated by decantation from the cementate, of which at least part is contacted with fresh aqueous solution.

5. The process of claim 1, in which the solution to be purified is the raw solution of an electrolytic zinc process the impurity metals being cobalt and nickel.

6. The process of claim 1, in which the reducing conditions are obtained and maintained by means of additions of zinc powder.

7. The process of claim 1, in which the reducing conditions are obtained and maintained by means of electrolysis.

8. The process of claim 5, in which the temperature in the cementation is within the range 70°–100°C.

9. The process of claim 1 in which the aqueous solution is contacted with a cementate the quantity of which is about 10 to 150g/l in proportion to the quantity of the aqueous solution.

10. The process of claim 1 in which the aqueous solution is contacted with a cementate the quantity of which is about 30 to 50 g/l in proportion to the quantity of the aqueous solution.

11. The process of claim 1, wherein impurity metals are continuously cemented in several stages from a flow of the aqueous solution, at least part of the cementate being recycled from the last of said stages to the first of said stages.

* * * * *

UNITED STATES PATENT AND TRADEMARK OFFICE
CERTIFICATE OF CORRECTION

PATENT NO. : 3,979,266
DATED : September 7, 1976
INVENTOR(S) : Sigmund Peder Fugleberg; Jussi Kalevi Rastas It is certified that error appears in the above-identified patent and that said Letters Patent are hereby corrected as shown below:

Col. 3, line 25     "- is by means" should read
                    -- - is cemented by means --

Col. 3, line 36     "which the" should read
                    -- which dominates the --

Col. 3, line 49     "coblt" should read --cobalt--

Signed and Sealed this

Fourteenth Day of December 1976

[SEAL]

Attest:

RUTH C. MASON
Attesting Officer

C. MARSHALL DANN
Commissioner of Patents and Trademarks